(12) United States Patent
Hirschbolz et al.

(10) Patent No.: US 11,754,277 B2
(45) Date of Patent: Sep. 12, 2023

(54) HOUSEHOLD REFRIGERATION APPLIANCE WITH PLATELIKE LIGHTING MODULE

(71) Applicant: BSH Hausgeraete GmbH, Munich (DE)

(72) Inventors: Andreas Hirschbolz, Syrgenstein (DE); Tobias Mayr, Bachhagel (DE); Armin Weber, Lauchheim (DE)

(73) Assignee: BSH Hausgeraete GmbH, Munich (DE)

( * ) Notice: Subject to any disclaimer, the term of this patent is extended or adjusted under 35 U.S.C. 154(b) by 30 days.

(21) Appl. No.: 17/487,192

(22) Filed: Sep. 28, 2021

(65) Prior Publication Data

US 2022/0099288 A1 Mar. 31, 2022

(30) Foreign Application Priority Data

Sep. 28, 2020 (DE) .......................... 102020212208.3

(51) Int. Cl.
  *F21V 33/00* (2006.01)
  *F21V 8/00* (2006.01)
  *F21V 17/16* (2006.01)
(52) U.S. Cl.
  CPC ........ *F21V 33/0044* (2013.01); *F21V 17/164* (2013.01); *G02B 6/0055* (2013.01); *G02B 6/0088* (2013.01)

(58) Field of Classification Search
  CPC . F21V 33/0044; F21V 17/164; G02B 6/0055; G02B 6/0088
  See application file for complete search history.

(56) References Cited

U.S. PATENT DOCUMENTS

| 10,895,416 B2 | 1/2021 | Weber et al. |
| 2012/0106129 A1* | 5/2012 | Glovatsky ............. F25D 23/067 362/92 |
| 2019/0338941 A1* | 11/2019 | Signorino ............... F21V 13/04 |

FOREIGN PATENT DOCUMENTS

DE 102018205757 A1 10/2019

* cited by examiner

*Primary Examiner* — Andrew J Coughlin
*Assistant Examiner* — Jessica M Apenteng
(74) *Attorney, Agent, or Firm* — Laurence A. Greenberg; Werner H. Stemer; Ralph E. Locher (57) ABSTRACT

A household refrigeration appliance having a receiving space for food and a plate-like lighting module for lighting the receiving space. The plate-like lighting module has a support apparatus, on which at least a light source module and a plate-shaped light guide are arranged. The support apparatus has a front frame which is a visible component of the lighting module facing the receiving space, and the front frame has a front strip, on the rear side of which a support web is arranged protruding backward and is formed in one piece with the front strip. The light source module is arranged on the support web.

15 Claims, 7 Drawing Sheets

HOUSEHOLD REFRIGERATION APPLIANCE WITH PLATELIKE LIGHTING MODULE

CROSS-REFERENCE TO RELATED APPLICATION

This application claims the priority, under 35 U.S.C. § 119, of German Patent Application DE 10 2020 212 208.3, filed Sep. 28, 2020; the prior application is herewith incorporated by reference in its entirety.

FIELD AND BACKGROUND OF THE INVENTION

One aspect of the invention relates to a household refrigeration appliance having a receiving space for food. The household refrigeration appliance additionally has a plate-like lighting module for lighting the receiving space. This plate-like lighting module has a support apparatus, on which at least a light source module and a plate-shaped light guide are arranged.

So that the illumination of a receiving space of this type is as uniform and homogeneous as possible, plate-like lighting modules are known. For example, in this respect a household refrigeration appliance with interior lighting is known from DE 10 2018 205 757 A1. The structure of the plate-like lighting module therein provides for a support plate to be arranged at the rear, which in cross-section has a groove at the edge open to the front, on which a printed circuit board with a light source is arranged. Viewed toward the receiving space, a plate-shaped light guide is arranged in front of the support plate. The light of the light source is coupled into this laterally. The production of this configuration is relatively difficult in this respect. This rear and thus posterior support plate is relatively complex in shape.

In addition, with known conventional plate-shaped lighting modules a complex adhesive process is necessary, in order to be able to connect individual components to one another. In this case adhesive can then also penetrate between these components of this lighting module. As a result, the lighting function of the lighting module may be impaired.

SUMMARY OF THE INVENTION

It is the object of the present invention to create a household refrigeration appliance in which the plate-shaped lighting module is improved.

This object is achieved by a household refrigeration appliance in accordance with the claims. A household refrigeration appliance which comprises:

a receiving space;

a plate-like lighting module for lighting a receiving space, the plate-like lighting module having a support apparatus, and a light source module and a plate-shaped light guide arranged on the support apparatus;

the support apparatus having a front frame, the front frame being a visible component of the lighting module facing the receiving space;

the front frame having a front strip, and a support web arranged on a rear side of the front strip and protruding backward from the front strip, and the support web being formed in one piece with the front strip; and the light source module being arranged on the support web or on the rear side of the front strip.

In other words, one aspect of the invention relates to a household refrigeration appliance having at least one receiving space for food. The household refrigeration appliance additionally has at least one plate-like lighting module. This lighting module is intentionally provided and arranged for lighting the receiving space. This plate-like lighting module has a support apparatus. Arranged on this support apparatus is at least one light source module of the lighting module. In addition, a plate-shaped light guide of the lighting module is arranged on this support apparatus. The support apparatus has a front frame. This front frame is a visible component of the lighting module facing the receiving space. Viewed toward the receiving space, this front frame is thus the component closest to the receiving space. The front frame thus represents a surround of the lighting module. It is not a plate-shaped component. It closes the lighting module off from the receiving space. This front frame has a front strip. A support web of the front frame is integrally molded on this front strip. This support web is directly arranged on the rear of the front strip facing away from the receiving space. It is arranged protruding backward from this rear side and thus facing away from the receiving space. It is formed in one piece with the front strip. The light source module is arranged directly on this support web or directly on the rear side of the front strip. A lighting module is therefore created in which a front visible component of the lighting module is designed quite specifically, namely as a front frame. Arranged on one specific component of this front frame is the light source module of the lighting module. Configuring a lighting module in this way enables greater ease of assembly. In particular, adhesive processes and thus adhesive connections can also be reduced at least significantly in this context. Thus, the penetration of adhesive between individual components of the lighting module, which would as a result impair the lighting function of the lighting module, can also be better prevented. In the proposed lighting module this front frame then also serves as a direct support for the light source module. As a result, the installation of the light source module is also simplified during assembly. In particular, the specific position of this light source module on the front frame, namely on a specifically provided support web, is advantageous. This support web is robust and can thus receive the light source module more extensively and over a larger surface. In addition, an advantageous shade or screen toward the receiving space is also formed by the front strip of the front frame. This is because this light source module is located behind this front strip. As a result, an undesired escape of light directly forward to the receiving space can be better prevented. In particular, thanks to these positions of the light source module an improved coupling-in into the plate-shaped light guide is enabled.

In one exemplary embodiment the light source module is covered toward the receiving space on the support web by a partial region of the front strip. The advantages achieved thereby have already been mentioned above. Thus, a front strip, viewed toward the hole region of the front frame, so to speak projects inward with respect to the support web.

In one exemplary embodiment the front frame is an outer peripheral frame of the lighting module. It thus closes the lighting module off at the edge and thus at the periphery. The front frame thus also serves as a corresponding surround. It thus represents a front support frame which serves to receive further components of the lighting module.

In one exemplary embodiment the lighting module has a rear cover. The positioning and conception of a rear cover in this respect relates to the position relative to the receiving space. This means that the rear cover is further away from or faces further away from the receiving space than other components of the lighting module. Thanks to the rear cover the lighting module is covered on the side facing away from the receiving space. This rear cover is a component separate from the front frame. A hole region bordered or peripherally surrounded by the front frame is covered from behind by this rear cover. Thus, this hole region is also so to speak closed from behind.

In one exemplary embodiment a snap element is formed on the support web of the front frame. In particular, the at least one snap element is integrally molded in one piece on this support web. This rear cover is mechanically fastened to or directly coupled to this support web, in particular the snap element. In particular this rear cover is directly snap-fitted onto the support web by this snap element. Thanks to a configuration such as this a very simple and nevertheless mechanically stable and high-function non-destructably detachable connection can be created between the support web and the rear cover. In particular, an adhesive connection is not required in this respect.

In one exemplary embodiment the plate-like light guide is arranged between the front frame and the rear cover. In particular it is provided that a partial region of this plate-shaped light guide extends with a first lateral edge region of this light guide into an intermediate space between the front strip and the rear cover. This first lateral edge region faces toward the light source module. It is arranged directly adjacent to or next to this light source module. The light of the light source module can thus be easily and extensively coupled into the plate-shaped light guide by this first lateral edge region. In particular, the region in which the lateral edge region and the light source module are located is covered toward the receiving space by the front strip of the front frame. Thus, a particularly high proportion of the light emitted by a light source of the light source module is coupled into this first lateral edge region. A high-functional concept is provided in this respect. In addition, thanks to this configuration of the front frame and the positioning of the rear cover the light guide is also held positionally stable therebetween. In this respect a sandwich-like structure is achieved. In this exemplary embodiment the first lateral edge region is in particular oriented at an angle of 90° to the front side of the light guide.

In one exemplary embodiment the light source module is arranged on the rear side of the front strip. The light guide has a laminar front side facing the receiving space. The light guide has a first lateral edge region which adjoins the front side. The lateral edge region is the narrow side or the border edge of the light guide. A depression is formed in a surface region of the front side, which in particular is adjacent to the first lateral edge region. The light source module extends into this depression. In one exemplary embodiment the first lateral edge region is formed at least in part as a chamfer in addition to or in place of this. Light which is coupled into the light guide from the light source module through the front side, in particular the depression, is reflected off the chamfer in the light guide and is guided further in the light guide. The chamfer is in particular arranged at an interior angle of between 30° and 80° to the plane of the front side. The chamfer is straight in the cross-section of the light guide.

In one exemplary embodiment a second lateral edge region of the light guide is arranged in the lighting module not for direct coupling-in of the light of the light source module. A reflective element is arranged at this second lateral edge region in one exemplary embodiment. This is a further very advantageous configuration. This is because light can thus be coupled in for example only from one lateral edge region of an angled, in particular quadrangular, plate-shaped light guide. An undesired escape of the light can then be prevented, in particular at lateral edge regions via which light of the light source module is not coupled in, in that a reflective element of this type is arranged there. Thanks to this reflective element it is also possible for the light in the light guide to be guided to the desired exit point of the light guide. This reflective element at this second lateral edge region can be a coating or a reflective adhesive tape, for example.

In one exemplary embodiment an elastically compressible equalization mat is arranged between the plate-shaped light guide and the rear cover. The plate-shaped light guide and the rear cover are two separate components of the lighting module. Thanks to this additional, in particular separate, compressible equalization mat the mechanical linkage of the components of the lighting module can be improved. In particular shape and assembly tolerances can thereby be equalized and the individual components of the lighting module can be arranged in a fixed position to one another. In particular, mechanically non-destructive detachable connections, such as snap connections for example, can thus then also be snap-fitted in a tolerance-free manner. Thanks to the compressible equalization mat corresponding tolerances are equalized in this respect.

In addition, thanks to this equalization mat a masking of the light guide is also made possible on the posterior or rear side facing away from the receiving space. A light loss in this respect can thus likewise be better prevented.

In one exemplary embodiment this rear cover has snap elements. With these the lighting module can be fastened as intended to a wall, separate from the lighting module, of the household refrigeration appliance with a snap connection or fixed thereto. The rear cover is thus provided as a multifunctional component in this exemplary embodiment.

In one exemplary embodiment a reflective structure is formed on the rear side of the plate-shaped light guide facing away from the front strip. In particular this reflective structure is integrated into this rear side and is thus formed in one piece with it. Thanks to this reflective structure it is advantageously achieved that the light of the light source module coupled in via the specific lateral edge region is not partially lost via this rear side facing away from the receiving space, but is guided by this reflective structure generated in a defined manner to the front side or front surface of the plate-shaped light guide, where it is radiated into the receiving space in an as extensive and homogenous manner as possible. In particular the light coupled into the plate-shaped light guide is thus coupled out via the front side or front surface facing the receiving space and is radiated into the receiving space.

In one exemplary embodiment an additional reflective element is fixed to the rear side of the plate-shaped light guide facing away from the front strip. This reflective element is then not integrated into the light guide itself or formed in one piece therewith. For example, this can be a reflective foil or a reflective coating. Where appropriate an integrated reflective structure can then be dispensed with. However, this can also be additionally present.

In one exemplary embodiment, in which this reflective element and the compressible equalization mat are present, this reflective element is arranged between the plate-shaped light guide and this compressible equalization mat.

In one exemplary embodiment the lighting module has a diffusor plate. This diffusor plate covers the plate-shaped light guide viewed toward the receiving space at least in part. Thus, the light radiation is also enabled laminarly in a more even and homogeneous manner.

In one exemplary embodiment the diffusor plate and the plate-shaped light guide are connected to one another in a material-bonded manner as an additional reflective element. A particularly functional configuration in respect of the light guidance is thus achieved.

In one exemplary embodiment the support apparatus has an interior frame separate from the front frame. Arranged on this interior frame are the plate-shaped light guide and a rear cover of the lighting module. In particular, this interior frame has ventilation openings in one exemplary embodiment. Thus, multifunctionality can likewise be assigned to this interior frame. On the one hand, the more stable mounting of the plate-shaped light guide and of further components of the lighting module is enabled, while on the other hand an exchange of air between the receiving space and the region behind the lighting module can thus be enabled in an intended and targeted manner.

An air duct section can be arranged on a rear side of the lighting module. As a result, a flow duct is formed by the lighting module and the air duct section. Cold air can flow therein and can then penetrate into the receiving space through the ventilation openings in the interior frame.

In one exemplary embodiment the rear cover is connected to the interior frame by a non-destructibly detachable connection. In particular, a snap connection is provided.

Thanks to this lighting module an extensive and in particular also continuous lighting is enabled. The lighting module can be arranged in the receiving space. It can for example be arranged in the rear region of the receiving space. For example, it can be arranged on a rear wall of an inner container which delimits the receiving space. However, it is likewise also possible for a lighting module to be arranged on a vertical side wall of an inner container which delimits the receiving space. A lighting module can also be arranged on an interior lining of a door of the household refrigeration appliance. This interior lining faces the receiving space in the closed state of the door. The receiving space is then delimited forward by this interior lining of the door. It is likewise possible for a lighting module to be arranged on a ceiling wall and/or on a base wall of an inner container which delimits the receiving space.

In one exemplary embodiment it can be provided that the front frame and the interior frame as well as the diffusor element or the diffusor plate are connected to one another in a material-bonded manner.

The light source module preferably has at least one printed circuit board. Arranged on this are light sources, in particular light-emitting diodes.

The reflective structure present in one exemplary embodiment on the rear side of the light guide can be a laser structure in one exemplary embodiment. This means that it is generated by a laser. As a result, it can be designed to be particularly precise and versatile. The rear cover is in particular formed in one piece. It is in particular formed from plastic. In particular it is then possible for the rear cover to be connected to the front frame and the interior frame in a force-fit and positive-fit manner. In particular if the compressible equalization mat is also present.

The stipulations "up", "down", "front", "rear, "horizontal", "vertical", "depth direction", "width direction", "height direction", etc. stipulate the positions and orientations existing for the intended use and intended arrangement of the appliance.

Further features of the invention emerge from the claims, the figures and the description of the figures. The features and feature combinations mentioned above in the description, as well as the features and feature combinations mentioned below in the description of the figures and/or shown separately in the figures can be used not only in the respectively stipulated combination, but also in other combinations, without departing from the scope of the invention. Embodiments of the invention that are not explicitly shown and explained in the figures but that can however emerge and be generated by separated feature combinations from the embodiments explained are thus also to be regarded as included and disclosed. Embodiments and feature combinations that thus do not have all the features of an originally formulated independent claim are also to be regarded as disclosed. Embodiments and feature combinations, in particular thanks to the embodiments set out above, that go beyond or depart from the feature combinations set out in the back-references of the claims are additionally to be regarded as disclosed.

Other features which are considered as characteristic for the invention are set forth in the appended claims.

Although the invention is illustrated and described herein as embodied in household refrigeration appliance with specifically designed plate-like lighting module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures identical or functionally identical elements are provided with the same reference characters.

Figure 1:
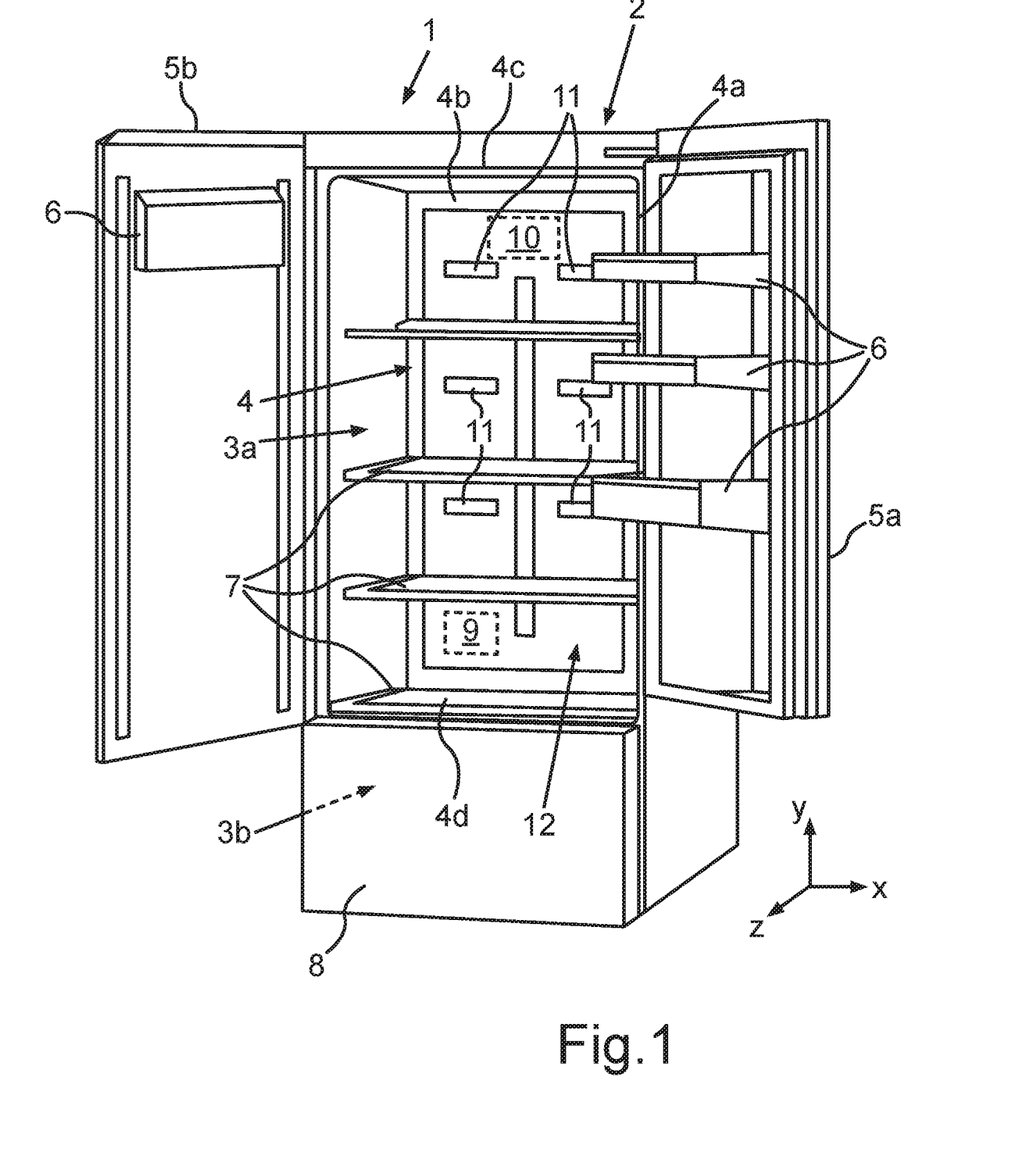
FIG. 1 shows a perspective representation of an exemplary embodiment of an inventive household refrigeration appliance with an exemplary embodiment of an inventive lighting module.

FIG. 1 shows a perspective representation of a household refrigeration appliance 1. The household refrigeration appliance 1 is designed to store and preserve food. It can be a refrigerator or a freezer or a fridge-freezer combination device.

The household refrigeration appliance 1 has a housing 2. A first receiving space 3a is formed in the housing 2. This first receiving space 3a is a refrigeration space in the exemplary embodiment. In an advantageous exemplary embodiment the household refrigeration appliance 1 has a second receiving space 3b separate from this. This receiving space 3b is a freezer space in one exemplary embodiment.

As can be seen, the first receiving space 3a is delimited by an inner container 4. This inner container 4 has vertical side walls 4a, a rear wall 4b, a ceiling wall 4c and a base wall 4d.

In the exemplary embodiment shown this first receiving space 3a can, when viewed forward in the depth direction (z-direction), be closed by at least one door. In the exemplary embodiment two separate doors 5a and 5b are provided in this respect. These are hinged doors that can each pivot about a vertical axis. In FIG. 1 they are shown in the open state. The doors 5a and 5b can have door racks 6 in one exemplary embodiment.

Shelves 7 can also be arranged in the receiving space 3a by way of example.

The further receiving space 3b can be closed at the front by a further door 8. The further door 8 can be a front wall of a drawer. This door 8 is separate from the two doors 5a and 5b.

The household refrigeration appliance 1 additionally has a control apparatus 10 in the exemplary embodiment. This is in particular at least designed to activate a refrigeration apparatus 9 of the household refrigeration appliance 1, such that the receiving space 3a and the receiving space 3b have a predefined or predefinable target temperature. In particular, a controller can also be provided here. In particular, it is provided that the household refrigeration appliance 1 has an air duct or flow duct running at least partially on the rear wall 4b and coupled to the refrigeration apparatus 9. This has at least one duct opening, in particular multiple duct openings 11, which in the exemplary embodiment shown here end in the receiving space 3a. As a result, it is possible for air cooled by the refrigeration apparatus 9 to penetrate into the receiving space 3a via the air duct and the duct openings 11. Corresponding provision can also be made in respect of the receiving space 3b. The refrigeration apparatus 9 can have a condenser, an evaporator and a compressor.

Furthermore, the household refrigeration appliance 1 has a plate-shaped lighting module 12. This lighting module 12 is provided and arranged with the intention of lighting the receiving space 3a. In the exemplary embodiment this plate-shaped lighting module 12 is formed by a surface which corresponds to at least 50 percent, in particular at least 60 percent, in particular at least 70 percent, in particular at least 80 percent of the surface of the rear wall 4b. In particular, this lighting module 12 is arranged on this rear wall 4b in the exemplary embodiment shown. However, in another exemplary embodiment a lighting module 12 can also for example be arranged on a side wall 4a and/or on a ceiling wall 4c and/or on a base wall 4d and/or, in the closed state of a door 5a, 5b, on an interior lining of such a door 5a, 5b facing the receiving space 3a.

Figure 2:
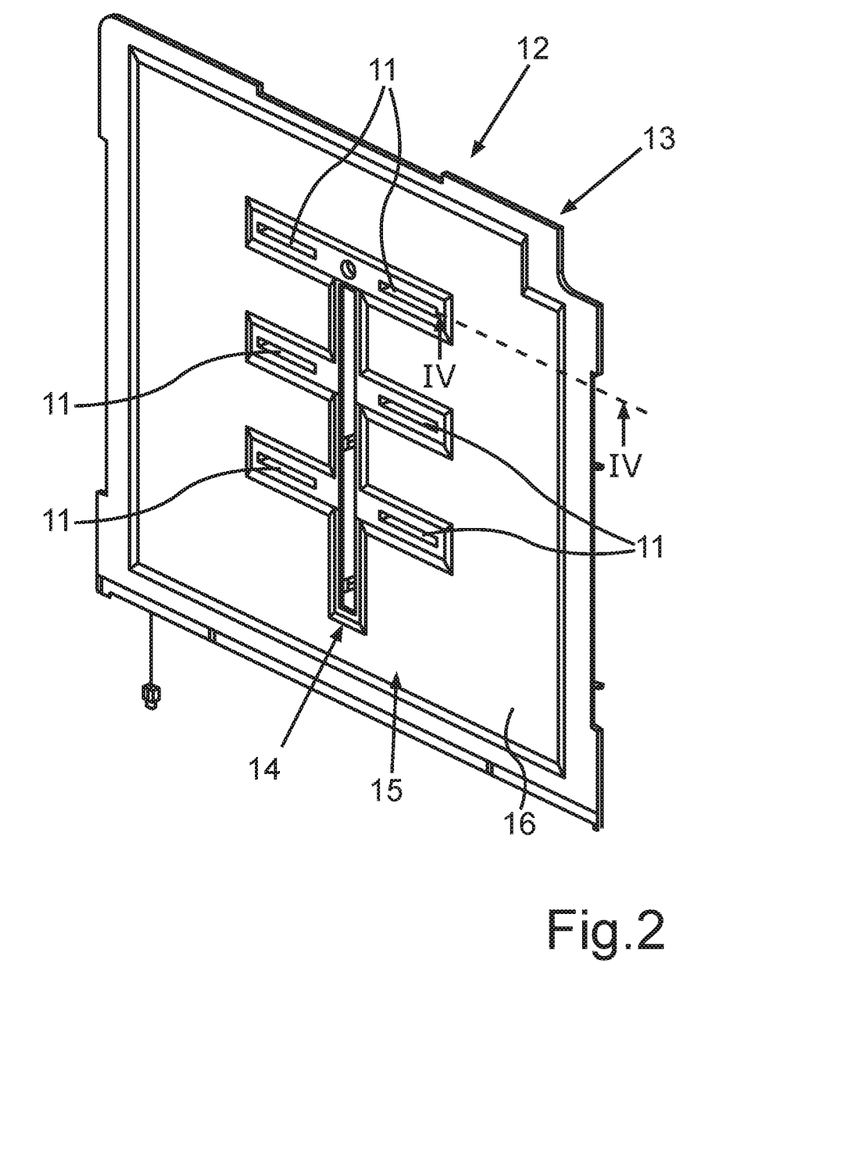
FIG. 2 shows a perspective representation of an exemplary embodiment of the lighting module from the front.

FIG. 2 shows a perspective representation of an exemplary embodiment of the lighting module 12. A view from the front is shown here. This means that the view is of the surface side of the lighting module 12 which in the mounted state faces the receiving space 3a. The lighting module 12 has a front frame 13. This front frame 13 is a peripheral surround of the lighting module 12. In the mounted state of the lighting module 12 this front frame 13 is an identifiable frame exposed toward the receiving space 3a. In this respect it is a corresponding visible component. In particular, it closes off the lighting module 12 forward and thus toward the receiving space 3a. In particular, the front frame 13 is designed as quadrangular. It is in particular formed in one piece, in particular from plastic. In addition, the lighting module 12 has an interior frame 14 in the exemplary embodiment. The interior frame 14 is a separate component from the front frame 13. The interior frame 14 is a frame arranged inside a hole region 15, which is peripherally surrounded and delimited by the front frame 13. It is designed as triple T-shaped. In particular, a stacked or cascaded arrangement of T-elements is achieved here when viewed in the height direction (y-direction). In particular, the duct openings 11 are formed in the horizontally oriented T-bar.

The lighting module 12 additionally has a diffusor or a diffusor plate 16. The diffusor plate 16 is arranged in the hole region 15. The diffusor plate 16 is connected to the front frame 13 at the outer edge region. Inward it is arranged on the interior frame 15. In particular, this diffusor plate 16 has a free punch which has the shape of this interior frame 14. As a result, the interior frame 14 can extend through this complementarily shaped through hole in the diffusor plate 16 through to the receiving space 3a.

Figure 3:
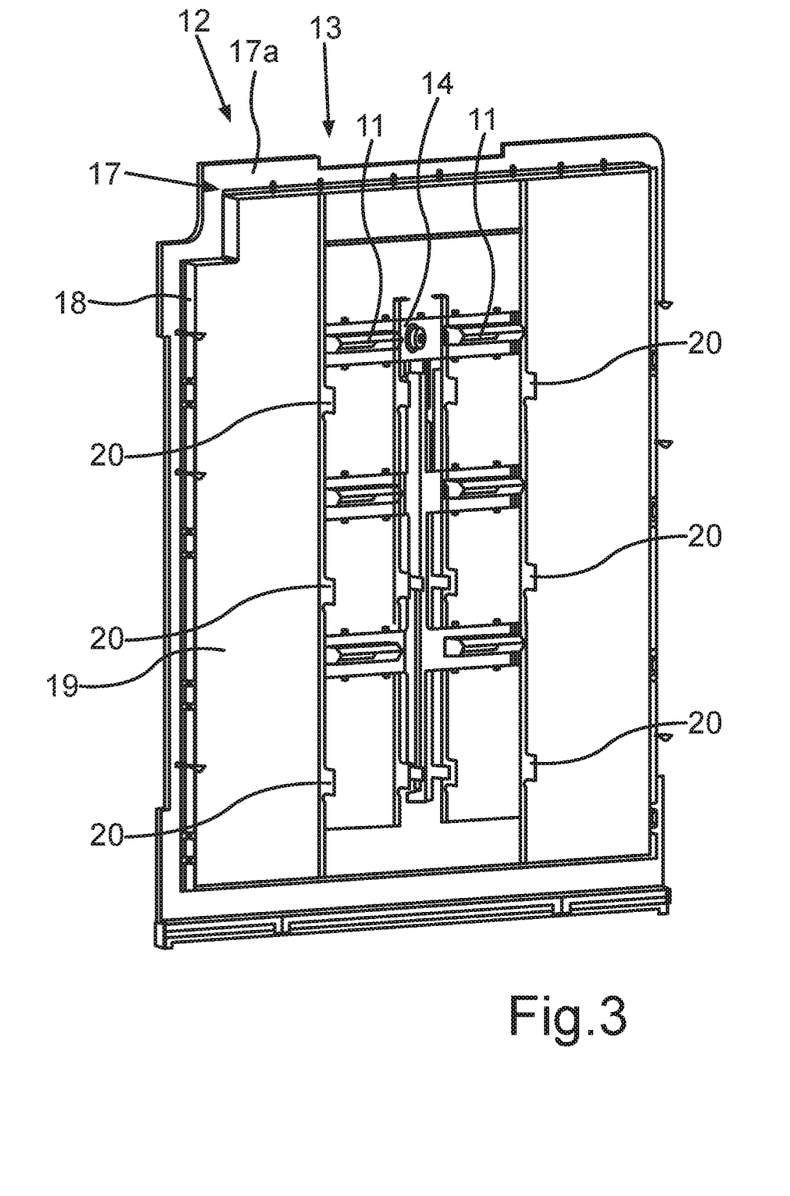
FIG. 3 shows a perspective representation of the lighting module in accordance with FIG. 2 from behind.

FIG. 3 shows the lighting module 12 in a perspective representation from the rear side and thus represented by the side reversed in FIG. 2. As can be seen, the front frame 13 has a front strip 17. This front strip 17, as is also shown in FIG. 2, is a frame band which is formed peripherally. A support web 18 of this front frame 13 is integrally molded on a rear side 17a of this front strip 17 facing away from the receiving space 3a. The support web 18 stands back from this rear side 17a and thus, facing away from the receiving space 3a, from this front strip 17. The front strip 17 and the support web 18 are formed in one piece with one another.

The lighting module 12 additionally has a rear cover 19, as is shown in FIG. 3. This is a component separate from the front frame 13. The rear cover 19 covers the hole region 15 at the rear. The rear cover 19 is fastened directly to the front frame 13 and in particular also to the interior frame 14. In one exemplary embodiment the rear cover 19 has snap elements 20. With these snap elements 20 the whole lighting module 12 can be fastened for example to the inner container 4, in particular for example the rear wall 4b, in one exemplary embodiment. Here only some of the snap elements 20 are provided with the corresponding reference characters.

Figure 4:
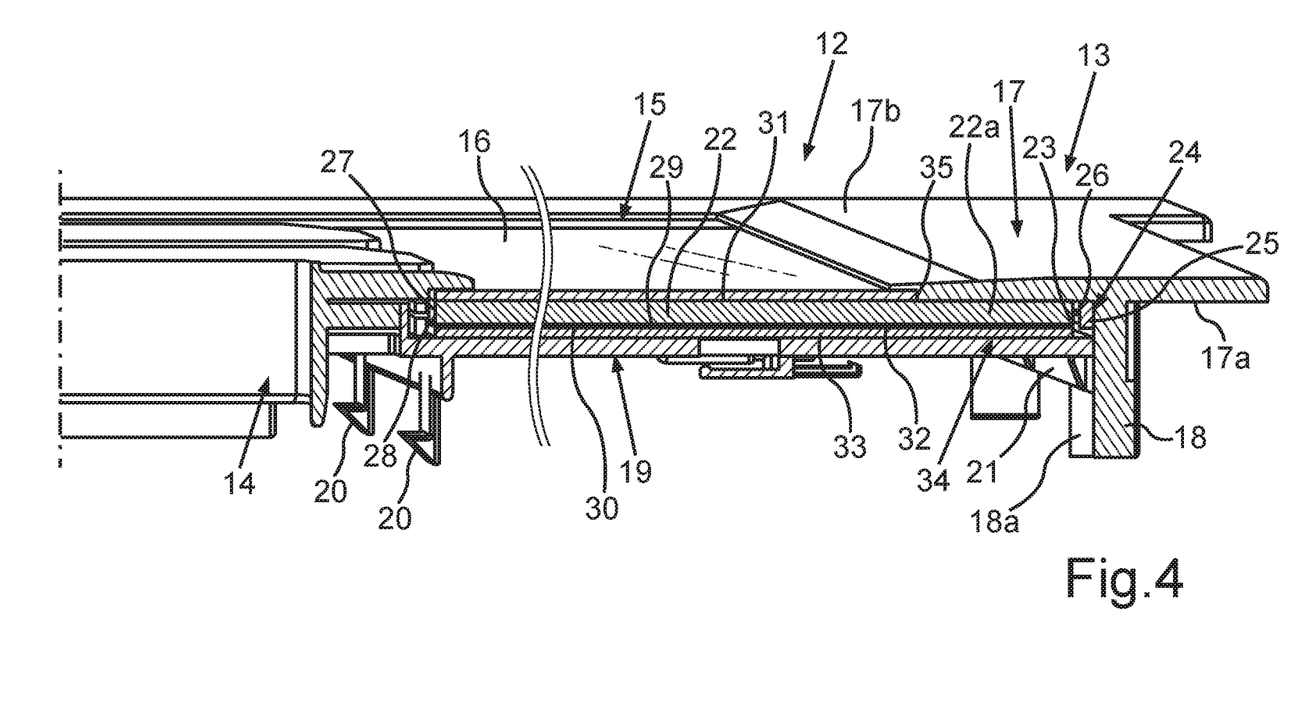
FIG. 4 shows a perspective sectional view through a partial region of the lighting module in accordance with FIG. 2 and FIG. 3.

FIG. 4 shows in a perspective sectional view a partial region of the lighting module 12 in accordance with FIG. 2 and FIG. 3.

As can be seen, a snap element 21 is integrally molded on an inner side 18a of the support web 18. This rear cover 19 is directly fastened to this snap element 21, in particular snap-fitted. In addition, this rear cover 19 is directly arranged on the interior frame 14. Here too, a snap connection can preferably be provided.

As can furthermore be seen, the lighting module 12 has a plate-shaped light guide 22. The plate-shaped light guide 22 extends by a partial region 22a into an intermediate space 34 between the front strip 17 and the rear cover 19. It faces the support web 18 with a first lateral edge region 23. With this support web 18, in particular the inner side 18a, a light source module 24 of the lighting module 12 is arranged. The light source module 24 has a printed circuit board 25 and at least one light source 26. This first lateral edge region 23 is arranged directly adjacent to and facing this light source 26. Light from this light source 26 is coupled into the plate-shaped light guide 22 directly via the first lateral edge region 23. As can be seen, this light source module 24 is thus arranged on this front frame 13. The light source module 24 is in particular arranged in a niche region formed by this front strip 17 and the support web 18. This light source module 24 is thus covered by the front strip 17 toward the receiving space 3a.

The plate-shaped light guide 22 has a second lateral edge region 27. This is different from the first lateral edge region 23. The second lateral edge region 27 is not arranged such that light of the light source module 24 would be coupled directly into it. In particular a reflective element 28 is arranged at this second lateral edge region 27. This can be a reflective adhesive tape or a reflective coating, for example. Thus coupled-in light is not coupled out again, which is not desired, via this second lateral edge region 27.

In one exemplary embodiment it is provided that a reflective structure 30 is formed on a rear side 29 of the plate-shaped light guide 22. This rear side 29 thus faces away from the receiving space 3a and faces the rear cover 19. Light coupled into the light guide 22 is coupled out as intended via a laminar front side 31 which faces the receiving space 3a. The front side 31 faces the front strip 17. It also faces the diffusor plate 16, in particular directly abuts this diffusor plate 16.

In one exemplary embodiment a reflective element 32 is arranged on the rear side 29 of the plate-shaped light guide 22 and is separate therefrom. This reflective element 32 can be a film or a coating.

In a further exemplary embodiment the lighting module 12 can have a compressible equalization mat 33. This is arranged between the plate-shaped light guide 22 and the rear cover 19. It is compressible in the direction of the light guide 22. As a result, the arrangement of the components in a fixed position to one another can be achieved. Manufacturing and position tolerances can be equalized by this compressible equalization mat 33. As can additionally be seen, a partial region 17b of the front strip 17 is formed as tiered toward the light guide 22. As a result, the diffusor plate 16 can likewise be covered and received at the front at the edge region to the receiving space. In particular a compression force perpendicular to the plane of the lighting module 12 is thereby enabled and is generated by connecting the rear cover 19 and the front frame 17. The components lying therebetween can thus be pressed against one another. As can be seen, the diffusor plate 16 extends less closely to the support web 18 than does the light guide 22. Thanks to a tier 34 on the rear side 17a of the front strip 17 the diffusor plate 15 is arranged in its position. In this respect the tier 35 also serves as a stop.

Figure 5:
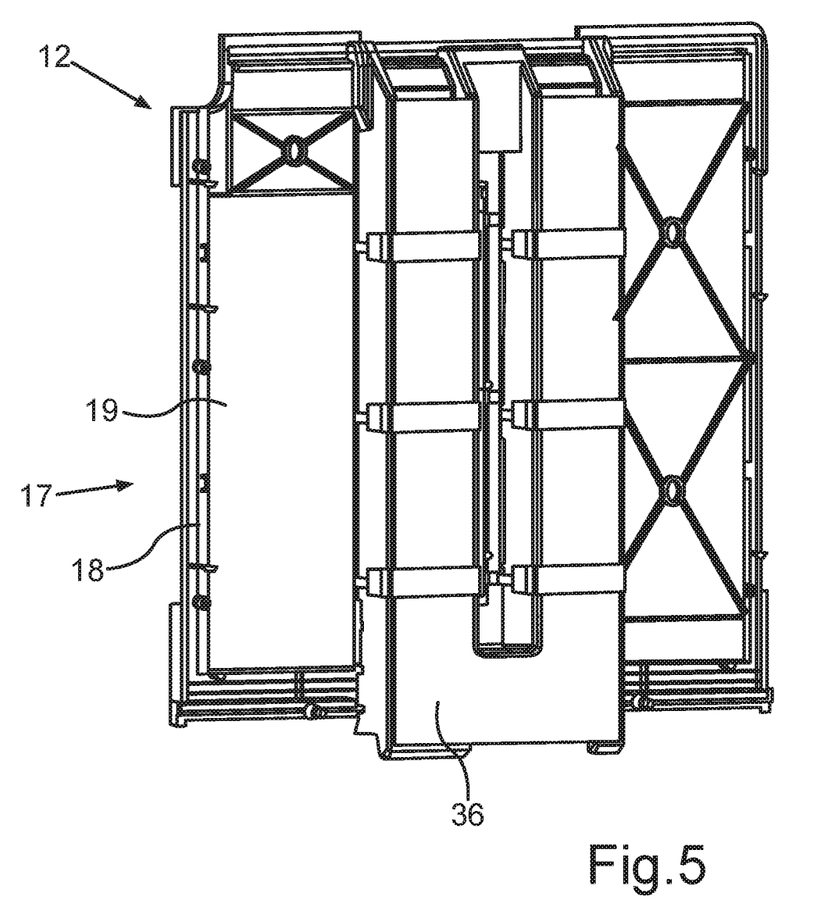
FIG. 5 shows a perspective view of the lighting module from behind with an air duct section arranged thereon.

FIG. 5 shows the lighting module 12 in accordance with FIGS. 2 and 3. It is represented by a view of the rear side. Unlike FIG. 3, an air duct section 36 is also shown in FIG. 5. This is arranged directly on the rear side of the lighting module 12. As a result, a flow duct of the household refrigeration appliance 1 is formed. Cold air in the flow duct can then penetrate through the duct openings 11 into the receiving space 3a.

Figure 6:
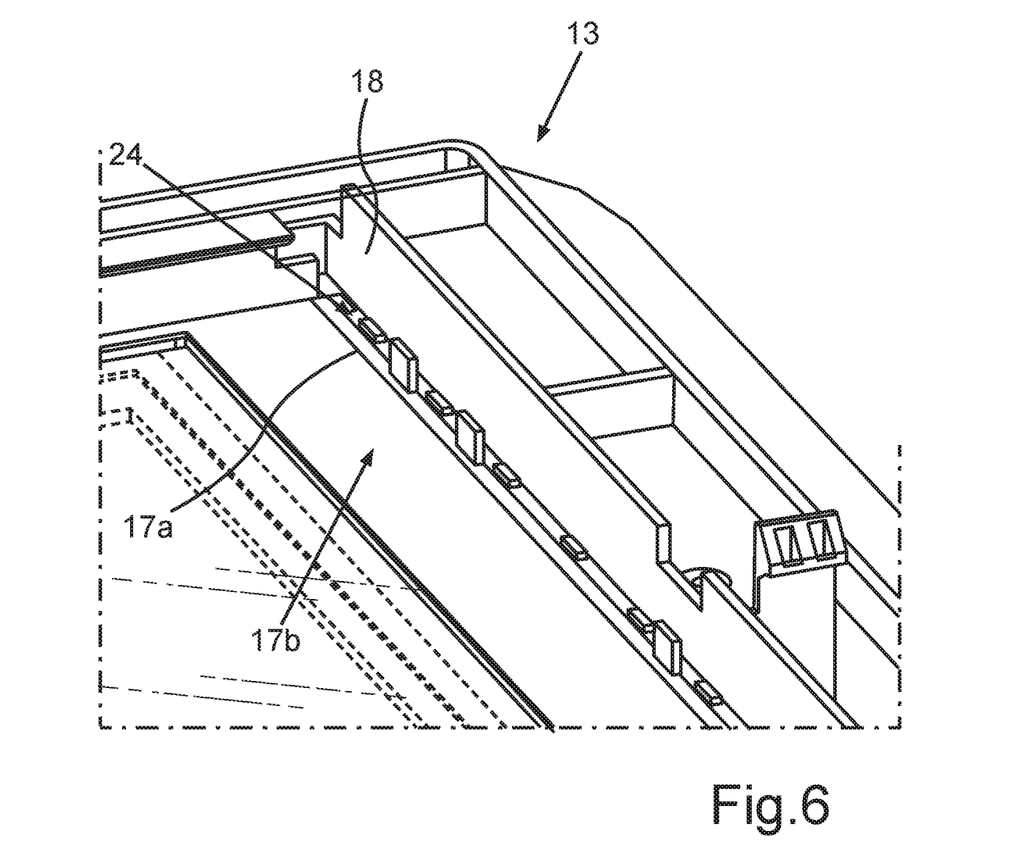
FIG. 6 shows a perspective representation of a partial region of a front frame of a lighting module with a light source module.

FIG. 6 shows a perspective representation of a partial region of the front frame 13. An exemplary embodiment is shown here, in which the light source module 24 is arranged directly on the rear side 17a of the front strip 17.

Figure 7:
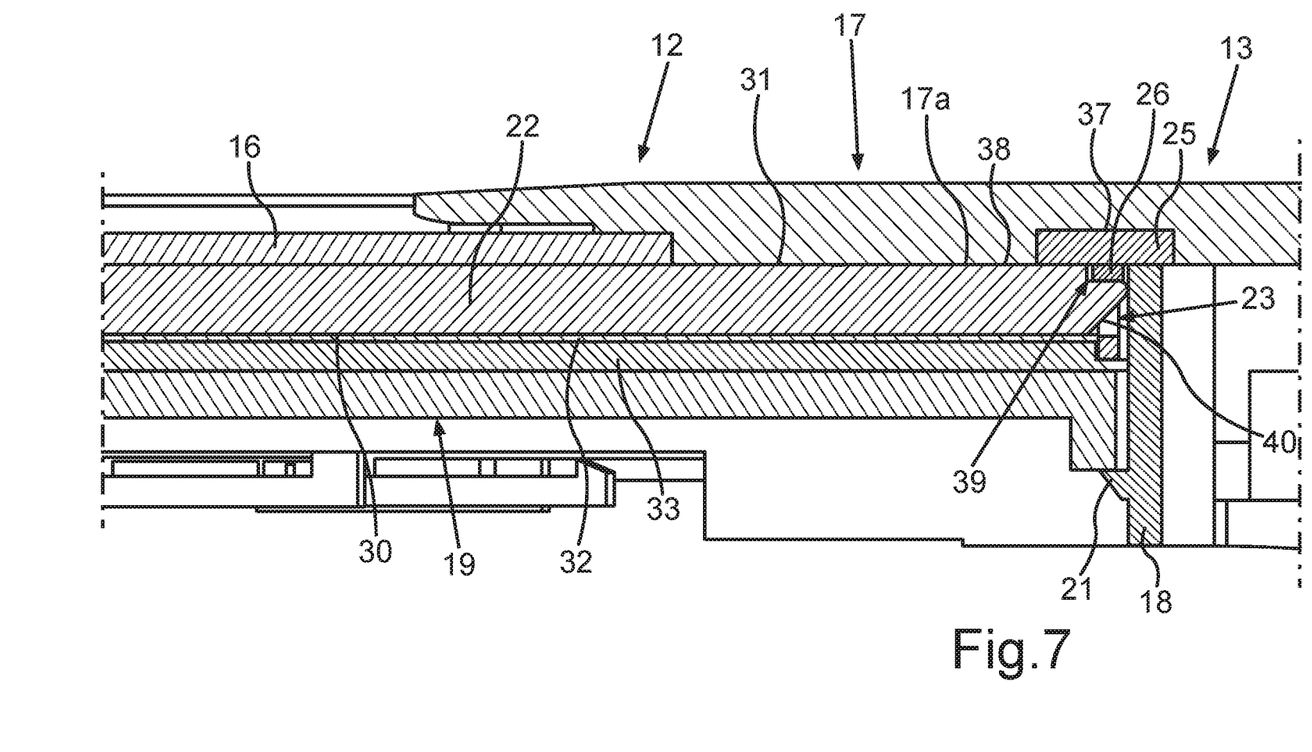
FIG. 7 shows a perspective sectional view through a partial region of a further exemplary embodiment of a lighting module.

FIG. 7 shows a perspective sectional view of a further exemplary embodiment of a lighting module 12. Unlike FIG. 4, the light source module 24 is here, as explained in FIG. 6, arranged on the rear side 17a of the front strip 17. The front strip 17 has a niche 37, into which the light source module 24 is arranged partially countersunk.

A depression 39 is formed at an end-side or edge-side region 38 of the surface of the front side 31. The light source 26 extends into this depression 39 of the light guide 22. The first lateral edge region 23 is here not provided for coupling in the light of the light source module 24. Instead, this first lateral edge region 23 is here formed as a chamfer 40. This can be seen in reference to the front side 31. The light of the light source module 24, which is coupled into the light guide 22 at the depression 39 through the front side 31, is then reflected off this adjacently arranged and obliquely oriented first lateral edge region 23 in the light guide 22.

The following is a summary list of reference numerals and the corresponding structure used in the above description of the invention:

1 Household device
2 Housing
3a First receiving space
3b Second receiving space
4 Inner container
4a Side wall
4b Rear wall
4c Ceiling wall
4d Base wall
5a Door
5b Door
6 Door racks
7 Shelf
8 Door
9 Refrigeration apparatus
10 Control apparatus
11 Duct opening
12 Lighting module
13 Front frame
14 Interior frame
15 Hole region
16 Diffusor plate
17 Front strip
17a Rear side
17b Partial region
18 Support web
18a Inner side
19 Rear cover
20 Snap element
21 Snap element
22 Light guide
22a Partial region
23 First lateral edge region
24 Light source module
25 Printed circuit board
26 Light source
27 Second lateral edge region
28 Reflective element
29 Rear side
30 Reflective structure
31 Front side
32 Reflective element
33 Equalization mat
34 Intermediate space
35 Tier
36 Air duct section
37 Niche
38 Region
39 Depression
40 Chamfer
y Height direction
z Depth direction

The invention claimed is:

1. A household refrigeration appliance comprising:
a receiving space;

a plate-like lighting module for lighting said receiving space, said plate-like lighting module having a support apparatus, and a light source module and a plate-shaped light guide arranged on said support apparatus;

said support apparatus having a front frame, said front frame being a visible component of said lighting module facing said receiving space;

said front frame having a front strip, and a support web arranged on a rear side of said front strip and protruding backward from said front strip, and said support web being formed in one piece with said front strip; and said light source module being arranged on said support web or on said rear side of said front strip; and a first lateral edge region of said light guide facing said light source module and said first lateral edge region being configured for coupling a light of said light source module into said light guide through said first lateral edge region.

2. The household refrigeration appliance according to claim 1, wherein said light source module is arranged on said support web and is covered by a partial region of said front strip toward said receiving space.

3. The household refrigeration appliance according to claim 1, wherein said front frame is an external peripheral frame of said lighting module.

4. The household refrigeration appliance according to claim 1, wherein said lighting module has a rear cover, said rear cover being a component separate from said front frame, and said rear cover being configured to cover a hole region surrounded by said front frame from behind.

5. The household refrigeration appliance according to claim 4, further comprising a snap element, said snap element being snap fitted on said rear cover, and said snap element being integrally molded on said support web.

6. The household refrigeration appliance according to claim 4, wherein:

said light guide is arranged between said front frame and said rear cover, and a partial region of said light guide extends by the first lateral edge region of said light guide into an intermediate space between said front strip and said rear cover.

7. The household refrigeration appliance according to claim 6, wherein:

said light source module is arranged on said rear side of said front strip and said light guide has a front side and a first lateral edge region;

a depression is formed in a surface region of said front side, said surface region being adjacent to said first lateral edge region, and said light source module extending into said depression; and/or said first lateral edge region is formed at least partially as a chamfer configured to reflect light that is coupled through said front side into said light guide from said light source module off said chamfer in said light guide.

8. The household refrigeration appliance according to claim 6, wherein a second side wall region of said light guide is not configured for direct coupling-in of said light of said light source module, and a reflective element is arranged on said second lateral edge region.

9. The household refrigeration appliance according to claim 4, further comprising an elastically compressible equalization mat arranged between said light guide and said rear cover.

10. The household refrigeration appliance according to claim 4, wherein said rear cover has snap elements and said lighting module can be fixed to a wall of the household refrigeration appliance by a snap connection via said snap elements.

11. The household refrigeration appliance according to claim 1, wherein a reflective structure is integrated on a rear side of said light guide facing away from said front strip or an additional reflective element is fixed to said rear side of said light guide facing away from said front strip.

12. The household refrigeration appliance according to claim 1, wherein said lighting module has a diffusor plate, said diffusor plate at least partially covers said light guide viewed toward said receiving space.

13. The household refrigeration appliance according to claim 12, wherein said diffusor plate, said light guide, and a reflective element fixed to a rear side of said light guide are connected in a material-bonded manner.

14. The household refrigeration appliance according to claim 1, wherein said support apparatus has an interior frame separate from said front frame and said light guide and a rear cover of said lighting module are arranged on said interior frame.

15. The household refrigeration appliance according to claim 14, wherein said rear cover is connected to said interior frame by a snap connection.

* * * * *